United States Patent Office
3,652,586
Patented Mar. 28, 1972

3,652,586
PROCESS FOR THE PRODUCTION OF SUBSTITUTED PHENYLACETIC ACIDS AND THEIR ESTERS
Rolf Denss, Basel, Switzerland, Niels Clauson-Kaas, Farum, Denmark, and Franz Ostermayer, Riehen, Switzerland, assignors to Geigy Chemical Corporation, Ardsley, N.Y.
No Drawing. Filed Apr. 22, 1969, Ser. No. 818,401
Claims priority, application Switzerland, Apr. 29, 1968, 6,375/68
Int. Cl. C07d 27/24
U.S. Cl 260—326.3                5 Claims

ABSTRACT OF THE DISCLOSURE

Process for the production of p-(1-pyrryl)-phenylacetic acids and their esters with analgesic and anti-inflammatory activity, comprising reacting a p-nitrosophenylacetic acid or an ester thereof with butadiene to obtain the corresponding p-(3,6-dihydro-2H-1,2-oxazin-2-yl)-phenylacetic acid or an ester thereof and subjecting said acid or ester to acidic and/or temperature conditions under which water is split off and ring contraction occurs, optionally hydrolysing the immediate reaction product either completely to form the desired acid or a salt thereof or converting it completely into a desired ester.

DETAILED DISCLOSURE

The present invention concerns a process for the production of substituted phenylacetic acids and their esters, which compounds have useful analgesic and anti-inflammatory activity.

More specifically, the present invention concerns a process for the production of compounds of the formula

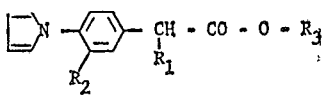

(I)

wherein $R_1$ is hydrogen, methyl or ethyl,
$R_2$ is hydrogen or halogen up to the atomic number 35, and
$R_3$ is hydrogen, methyl or ethyl, which compounds have valuable pharmacological properties, especially analgesic, anti-inflammatory and antipyretic activity.

These properties combined with a favorable therapeutic index characterize the compounds as active substances for the relief and removal of pains of various origin and for the treatment of rheumatic and other inflammatory diseases. Administration can be oral, rectal or parenteral.

A compound of Formula I is produced according to the present invention in a technically advantageous manner by reacting a compound of the Formula II (II)

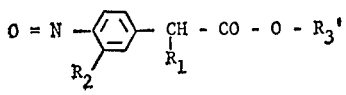

wherein $R_3'$ is lower alkyl, and
$R_1$ and $R_2$ have the meanings given under Formula I, with butadiene, subjecting either the obtained ester of Formula III

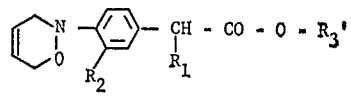

(III)

wherein $R_1$, $R_2$ and $R_3'$ have the meanings given under Formula I and Formula II, respectively, or the acid, obtained from said ester of Formula III by hydrolysis of the Formula IV

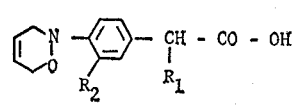

(IV)

wherein $R_1$ and $R_2$ have the meanings given under Formula I, to acidic and/or temperature conditions under which water is split off and ring contraction occurs and, optionally, hydrolysing the immediate reaction product either completely to form an acid embraced by Formula I or converting it completely into an ester embraced by Formula I.

The first stage of the reaction, i.e. reaction of the nitroso compound of Formula II with butadiene, is performed, for example, at temperatures between 0° and 80° in an organic solvent such as chloroform, benzene or acetic acid, or in an excess of butadiene, if necessary, in a closed vessel. The optionally subsequent hydrolysis is carried out in the usual manner, e.g. by treating the obtained compound of Formula III in an alkanolic alkali solution such as ethanolic sodium hydroxide solution, preferably at room temperature. The splitting off of water and transformation of the 3,6-dihydro-2H-1,2-oxazine derivatives of Formula III or IV into corresponding pyrrole derivatives of Formula I, is performed, for example, by fairly long boiling in a lower alkanoic acid, such as acetic acid or propionic acid in the presence or absence of an additional solvent such as, e.g. toluene, xylols or chlorobenzene.

Esters of Formula III are preferred for this variation of the process. Suitable as an acid treatment is also the action of a solution of hydrogen bromide in glacial acetic acid, or of a mixture of concentrated aqueous hydrobromic acid and glacial acetic acid at room temperature or at increased temperatures. With regard to the thermal splitting off of water under neutral conditions, a suitable process is, e.g. the distillation or sublimation of the compounds of the general Formula III or IV at temperatures of ca. 160–240° and pressures of ca. 0.001–15 torr.

If esters of Formula III are subjected to splitting off of water and ring contraction, by means of lower alkanoic acids with or without additional hydrobromic acid, then a partial solvolysis of the ester group occurs and, as immediate reaction products, mixtures of the lower alkyl ester and of the corresponding free acid are obtained. These mixtures are either transformed completely into the free acid or into alkali salts thereof by hydrolysis in a conventional manner, e.g. by boiling in an alkali solution such as ethanolic sodium hydroxide solution, or are converted completely into the corresponding lower alkyl ester embraced by Formula I by common esterification methods, e.g. by boiling or heating in the corresponding lower alkanol in the presence of ca. 1–3% concentrated sulfuric acid at temperatures between 65° and 80°.

The 2-(p-nitrosophenyl)-alkanoic acid alkyl esters of Formula II, optionally halogen substituted, which are used as starting materials for the reaction sequence according to the invention, are new compounds. They are produced, for example, by the reduction of corresponding p-nitro compounds, e.g. by means of zinc dust in ethanol, to give p-hydroxy-amino compounds and partial reoxidation of the latter, e.g. by means of iron(III)-chloride in aqueous-ethanolic solution.

The following examples will serve to further typify the nature of the present invention; they should not, however, be construed as a limitation on the scope thereof.

EXAMPLE 1

(a) 58.0 g. of (p-nitrosophenyl)-acetic acid ethyl ester and 50 ml. (0.60 mol) of butadiene are dissolved in 300 ml. of chloroform and the solution is allowed to stand for 30 hours at 0°. The reaction mixture is then concentrated by evaporation under 10 torr on a water-bath at 20°. The oily residue of 80 g. is crystallised from 550 ml. of petroleum ether (B.F. 50°)/ether (3.2), by cooling of the solution to —25° during ca. 15 hours. The [p-(3,6-dihydro-2H-1,2-oxazin-2-yl) - phenyl] - acetic acid ethyl ester, M.P. 32–34°, is obtained. A specimen distilled for the analysis (B.P. 128–130°/0.1 torr), melts at 35–36°, $n_D^{25} = 1.5448$.

(b) 1.0 g. of [p-(3,6-dihydro-2H-1,2-oxazin-2-yl)-phenyl]-acetic acid ethyl ester is refluxed with 7.5 ml. of toluene and 2.5 ml. of propionic acid for 5 days. The dark reaction mixture is concentrated by evaporation to dryness under 10 torr and the residue is sublimed at 200° within one hour. The semi-crystalline sublimate which contains both [p-(1-pyrryl)-phenyl]-acetic acid and its ethyl ester, is refluxed with 5.2 ml. of 1 N sodium hydroxide solution and 5 ml. of ethanol for one hour for complete transformation into the acid. After cooling, the alkaline solution is mixed with 13.6 ml. of 0.57 N hydrochloric acid. The precipitated crystals are filtered off, washed with water and dried, whereby the [p-(1-pyrryl)-phenyl]-acetic acid, M.P. 180–182°, is obtained.

The ethyl ester required as the starting material for (a), is produced as follows:

(c) 31.5 g. of (p-nitrophenyl)-acetic acid ethyl ester and 6.0 g. of calcium chloride are dissolved in 420 ml. of 99% ethanol and 150 ml. of water. The solution is heated, while stirring, to boiling and 50 g. (0.77 mol) of zinc dust are introduced at this temperature within 10 minutes. The reaction mixture is then refluxed for 15 minutes and filtered hot. The filtrate is washed twice with 75 ml. of ethanol each time. The filtrate and washing liquid are mixed, still hot, together with 375 ml. of water.

The obtained clear solution, which contains the (p-hydroxyamino-phenyl) - acetic acid ethyl ester, is rapidly cooled to 5° and is then poured, while vigorously stirring, into a solution of 90 g. of iron(III)-chloride-hexahydrate in 375 ml. of water at room temperature. A green solution is formed, from which the (p-nitrosophenyl)-acetic acid ethyl ester precipitates almost instantaneously in the form of yellow crystals. After 5 minutes the crystals are filtered off, thoroughly washed with water and dried for about 14 hours at 50°. The (p-nitrosophenyl)-acetic acid ethyl ester M.P. 71–72°, is obtained, and from this is obtained, by recrystallisation from water/acetic acid, the analytically pure substance, M.P. 72°.

EXAMPLE 2

0.5 g. of [p-(3,6-dihydro-2H-1,2-oxazin-2-yl)-phenyl]-acetic acid ethyl ester [cf. Example 1(a)] are refluxed with 3 ml. of propionic acid for 4 hours. The reaction mixture is hydrolised and prepared analogously to Example 1(b), whereby the [p-(1-pyrryl)-phenyl]-acetic acid is obtained.

EXAMPLE 3

10.0 g. of (p-nitrosophenyl)-acetic acid ethyl ester [cf. Example 1(c)] and 35 ml. of butadiene are dissolved in 50 ml. of chloroform and the solution is allowed to stand in a closed vessel for 24 hours at room temperature. The reaction mixture is then concentrated by evaporation on a water-bath at 90° under reduced pressure, and finally under 10 torr.

The oily residue of 13.0 g. of crude [p-(3,6-dihydro-2H-1,2-oxazin-2-yl)-phenyl]-acetic acid ethyl ester is refluxed with 60 ml. of acetic acid for 17 hours. The reaction mixture is distilled and the fraction which converts under 0.5–1.8 torr at 160–220°, is separated. The stated fraction, which contains both the [p-1-pyrryl)-phenyl]-acetic acid and the ethyl ester thereof, is refluxed with 2.6 g. of sodium hydroxide in 35 ml. of ethaanol and 35 ml. of water for one hour. The clear reaction solution is acidified and the precipitated [p-(1-pyrryl)-phenyl]-acetic acid is processed as in Example 1, whereby the [p-(1-pyrryl)-phenyl)-phenyl]-acetic acid, M.P. 180–182° is obtained.

EXAMPLE 4

(a) 15.5 g. of 2-(p-nitrosophenyl)-butyric acid methyl ester and 19 ml. of butadiene are dissolved in 75 ml. of chloroform and the solution is allowed to stand for 17 hours at 0°. The reaction mixture is then concentrated by evaporation on a water-bath at 75° under 10 torr. The addition product remaining as a residue in crystalline form, M.P. 53–55° is crystallised from water-methanol (1:10) by cooling to —25° during 30 minutes, whereby 15.9 g. of 2-[p-3,6-dihydro-2H-1,2-oxazine-2-yl)-phenyl]-butyric acid methyl ester, M.P. 57–59°, are obtained. A repeated recrystallisation of a specimen from water-methanol produces the analytically pure substance, M.P. 59–60°.

(b) 1.0 g. of 2-[p-(3,6-dihydro-2H-1,2-oxazin-2-yl)-phenyl]-butyric acid methyl ester is refluxed with 6 ml. of propionic acid for 3 hours. The reaction mixture, which contains the 2-[p-(1-pyrryl)-phenyl]-butyric acid and the methyl ester thereof, is hydrolysed and processed analogously to Example 1. The 2-[p-(1-pyrryl)-phenyl]-butyric acid, M.P. 101–110°, is obtained. With repeated recrystallisation from benzene cyclohexane (1:1) the M.P. increases to 112–113°.

The methyl ester required as starting material is produced as follows:

(c) 41.8 g. of 2-(p-nitrophenyl)-butyric acid are refluxed in a mixture of 200 ml. of methanol and 5 ml. of concentrated sulphuric acid for 4 hours. The reaction mixture is then concentrated under 11 torr., cooled to 0° and poured, while stirring, into ice water. The precipitated 2-(p-nitrophenyl)-butyric acid methyl ester is filtered off, washed with water and dried under 11 torr, M.P. 33–35°.

(d) 33.5 g. of 2-(p-nitrophenyl)-butyric acid methyl ester and 48.0 g. of ammonium chloride are dissolved in 720 ml. of methanol and 225 ml. of water. 50 g. of zinc dust are added in small portions, while vigorously stirring, within 20 minutes at room temperature and in a nitrogen atmosphere, whereby slight cooling is necessary. The reaction mixture is stirred for 15 minutes at room temperature and then it is poured through a filter at 0° into 53 ml. of 3 N hydrochloric acid which is being stirred. The filtrate is then washed with 80 ml. of methanol-water (1:3).

Filtrate and washing liquid, which contain the crude hydrochloride of the 2-(p-hydroxyamino-phenyl)-butyric acid methyl ester, are added dropwise at 7° within 10 minutes, while stirring, to a solution of 90 g. of iron (III)-chloride- hexahydrate in 375 ml. of water at 5°. The solution turns green and the 2-(p-nitrosophenyl)-butyric acid methyl ester begins to precipitate immediately as oil or as crystals (particularly in the case of inoculation). After the addition is completed, the solution is stirred for a further 5 minutes at 5°, whereupon the suspension is cooled to —15° and filtered. The reaction product, which is filtered off, is washed with 30 ml. of water-methanol (1:1) and then with water. The crystals are dried for 15 hours at 30–40°, whereby the crude 2-(p-nitrosophenyl)-butyric acid methyl ester, M.P. 45–48° is obtained. By dissolving the product in 210 ml. of methanol at room temperature while stirring, filtering off of the small amount of undissolved substance and leaving the solution to stand during 17 hours at −25°, the 2-(p-nitrosophenyl)-butyric acid methyl ester, M.P. 48–52°, is obtained, which is sufficiently pure for further processing. An analytically pure substance, M.P. 51–55°, is obtained by further crystallisation from methanol.

EXAMPLE 5

(a) A solution of 37.1 g. of [p-(3,6-dihydro-2H-1,2-oxazin-2-yl)-phenyl]-acetic acid ethyl ester (cp. Example 1(a)) in 900 ml. of ethanol and 700 ml. of water is added to a solution of 7.4 g. of sodium hydroxide in 200 ml. of water. The obtained emulsion is stirred at room temperature, whereby a clear solution is obtained after ca. 3 minutes. After stirring for one hour, 0.1 N hydrochloric acid is added until a pH value of 3.8 is obtained (ca. 1860 ml.) and the mixture is extracted four times with ether (500+300+300+300 ml.). Each extract is washed with 100 ml. of water. The extracts are then combined, dried over magnesium sulphate and concentrated by evaporation to dryness on a water-bath at 50° under reduced pressure, finally 10 torr. The crystalline residue of M.P. 124–130° (with decomposition), consists of crude [p-(3,6-dihydro-2H-1,2-oxazin-2-yl)-phenyl]-acetic acid. By crystallisation from methanol-water (3:2) and then twice from benzene, the pure substance, M.P. 134–135° (with decomposition) is obtained.

(b) 2.0 g. of the acid obtained according to (a), are sublimed under 0.03 to 0.50 torr at 150–200°. The crystalline sublimate is recrystallised twice from glacial acetic acid, whereby [p-(1-pyrryl)-phenyl]-acetic acid, M.P. 180–182°, is obtained.

EXAMPLE 6

(a) 2.61 g. of 2-[p-(3,6-dihydro-2H-1,2-oxazin-2-yl)-phenyl]-butyric acid methyl ester [cp. Example 4(a)] are dissolved in 55 ml. of ethanol and 57 ml. of 0.39 N sodium hydroxide solution and the solution is allowed to stand at room temperature for 24 hours. 0.18 N hydrochloric acid is then added to obtain a pH value of 2.2 (ca. 122 ml.). The obtained crystalline precipitate is filtered off, washed with 10 ml. of ethanol-water (1:3) and then twice with water and dried for one hour under 1 torr at 50°. The 2-[p-(3,6-dihydro-2H-1,2-oxazin-2-yl)-phenyl]-butyric acid, is obtained. Recrystallised from methanol-water (7:3), melts at 112–113°.

(b) 1.0 g. of the acid obtained according to (a) is sublimed at 150° under 0.2 torr. The crystalline sublimate is recrystallised twice from aqueous acetic acid and then once from glacial acetic acid, whereby the 2-[p-(1-pyrryl)-phenyl]-butyric acid, M.P. 112–113°, is obtained.

EXAMPLE 7

0.50 g. of the mixture of 2-[p-(1-pyrryl)-phenyl]-butyric acid and the ethyl ester thereof, obtained as crude reaction product according to Example 4(b), are refluxed with 5 ml. of methanol and ca. 0.1 ml. of concentrated sulphuric acid for 4 hours. The reaction mixture is then concentrated under 11 torr to about half its volume, cooled to 0° and poured into ice water. The precipitated, crude 2-[p-(1-pyrryl)-phenyl]-butyric acid methyl ester is filtered off, washed with ice cold sodium carbonate solution and then with water and dried for one hour under 11 torr at room temperature. After subsequent recrystallisation from methanol, the methyl ester melts at 56–58°.

EXAMPLE 8

0.5 g. of 2-[3-chloro-4-(3,6-dihydro-2H-1,2-oxazin-2-yl)-phenyl]-propionic acid methyl ester is heated under reflux with 3.0 ml. of propionic acid for 8.5 hours. The dark reaction mixture is evaporated to dryness under 10 torr and the residue distilled at 0.02 torr from an oil bath (115–210°). The distilled light yellow oil (0.42 g.), which contains 2-[3 - chloro - 4 - (1-pyrryl)-phenyl]-propionic acid as well as the corresponding methyl ester, is heated under reflux with 3.2 ml. N sodium hydroxide solution and 3.0 ml. of ethanol for 40 minutes. 3.2 ml. N hydrochloric acid is added to the cooled solution. The oil which separates is extracted with 15 ml. of ether. The ethereal extract is washed successively with 5 ml. of water, 10 ml. of N hydrochloric acid, and again with 5 ml. of water, and then extracted with 6 ml. N sodium hydroxide. The alkaline aqueous extract is washed with 10 ml. ether and acidified with 4 ml. of 3 N hydrochloric acid. The oil which separates is extracted with 15 ml. of ether. The ethereal extract is dried over magnesium sulphate, filtered and evaporated to dryness under reduced pressure from a water bath (80°). The resulting tea-colored oil (0.23 g.) is boiled with 10 ml. of cyclohexane. The cyclohexane solution is decanted from a dark oil and evaporated to dryness under reduced pressure from a water bath (80°). The resulting light yellow oil is dissolved in 3 ml. of ether. The solution is subjected to preparative thin-layer chromatography on a 1.50 mm. layer of Merck silica gel $PF_{254}$ on a glass plate (height: 200 mm., width: 450 mm.) activated by heating for 30 minutes at 120°. The development is performed with acetic acid carbon tetrachloride (1:28), whereby at least four compounds are separated. The 5 mm. broad, colorless band in the top of the chromatogram (position identified in UV) is removed from the plate and extracted with ether in a Soxhlet-type apparatus. The ethereal extract is evaporated to dryness under reduced pressure from a water bath (100°). The resulting semi-crystalline oil is distilled in a sublimation tube (150–180°, 0.05 torr 3 hours). The resulting light yellow oil is crystallised from cyclohexane yielding 2-[3-chloro - 4 - (1-pyrryl)-phenyl]-propionic acid, M.P. 75–77°. After recrystallisation M.P. 78–80°.

The starting material is prepared as follows:

(a) 101 g. methylmalonic acid diethyl ester is added dropwise with stirring over a period of 30 minutes at 25–30° under nitrogen to a suspension of 13.9 g. of sodium hydride in 1300 ml. of dry N,N-dimethylformamide (DMF). The suspension is heated to 95° and kept there for about 1 hour. When evolution of hydrogen ceases, the almost clear solution of sodium methylmalonic ester is cooled to room temperature. 129 g. of 2,5-dichloronitrobenzene is added in one portion and the resulting red solution heated at 95° for 3 hours. During heating to 95° it is noticeable that the reaction is exothermic. The brown, turbid reaction mixture is evaporated to dryness from a water bath (100°) under 10 torr. The oily residue is heated under reflux during 3 hours with 1160 ml. of ethanol, 580 ml. of water and 93 g. of sodium hydroxide pellets. 900 ml. of water is added and the mixture distilled under 70 torr until the distillation temperature is 50°. About 2100 ml. of distillate is collected. The ethanol-free residue is cooled to 20° and extracted with five 250 ml. portions of ether. The aqueous phase is acidified to pH 2 with 180 ml. of concentrated hydrochloric acid and the brown oil which separates extracted with two 500 ml. portions of ether. The combined ethereal extracts are washed with two 100 ml. portions of water to remove any DMF, dried with magnesium sulphate and evaporated to dryness from a water bath (100°) under 10 torr. The dark, oily residue is heated under reflux during 4 hours with 525 ml. of methanol and 20 ml. of concentrated sulfuric acid. The mixture is cooled to −10° and poured on to a mixture of 900 g. of ice water. The resulting emulsion is extracted with ether (600+150 ml.), the ethereal solution is extracted twice with 150 ml. of 20% of potassium hydrogen carbonate solution and twice with 100 ml. of water, and dried with magnesium sulphate. Evaporation of the ether and distillation of the residue gives 2-(3-chloro-4-nitrophenyl)-propionic acid methyl ester as an orange-yellow oil, $B.P._{0.2}$ 125–140°, $n_D^{25}$ 1.5448.

(b) 85 g. of 2-(3-chloro-4-nitro-phenyl)-propionic acid methyl ester and 113 g. of ammonium chloride are dissolved in 1690 ml. of methanol and 375 ml. of water. 116 g. of zinc powder is added in 5 g. portions under nitrogen over a period of 15 minutes at 20–25° with stirring. After addition is complete the mixture is stirred for another 15 minutes at 20–25°, cooled to 10°, and filtered with suction. The filtered solution is added with stirring to 117 ml. of 3 N hydrochloric acid cooled to —5 to —10°. The filter cake is washed with 250 ml. of water/methanol of 0°. The clear, light yellow filtrate (pH 1.5–2.0) containing the hydrochloride of 2 - (3- chloro-4-hydroxylamine-phenyl)-propionic acid methyl ester is added to a solution of iron (III) chloride [210 g. of iron (III) chloride hexahydrate in 685 ml. of water] with vigorous stirring at 0 to —5° over a period of 15 minutes. The green suspension is extracted three times with cold benzene (1500+500+500 ml.). The combined benzene extracts are washed at 0° with two 450 ml. portions of N hydrochloric acid, 400 ml. of water, two 450 ml. portions of 20% potassium hydrogen carbonate solution, and finally again two 400 ml. portions of water. The washed benzene extract is dried with magnesium sulphate and evaporated to dryness from a water bath (30°) under 10 torr. The 2-(3-chloro-4-nitrosophenyl)-propionic acid methyl ester remains as a green oil, which is used immediately for the following reaction.

(c) 43 g. of 2 - (3-chloro-4-nitrosophenyl)-propionic acid methyl ester is dissolved at —10° in a mixture of 48 ml. of butadiene and 190 ml. of chloroform, and the solution left standing for 16 hours at 0°. Evaporation to dryness under reduced pressure gives a red oil. This is distilled at 140°/0.001 torr in a bulb tube. By subsequent crystallisation from ligroine is obtained the 2-[3-chloro-4-(3,6-dihydro-2H-1,2-ozazin-2-yl)-phenyl]-propionic acid methyl ester as colorless crystals M.P. 45–46.5°. The 2-[3-chloro-4 - (3,6-dihydro-2H-1,2-oxazin-2-yl) - phenyl]-propionic acid, obtained by hydrolysis of the ester by means of sodium hydroxide solution, melts at 116–117° (from methanol/water).

EXAMPLE 9

6.9 g. of 2-[p-(1-pyrryl)-phenyl]-butyric acid are dissolved in 20 ml. of benzene by warming and mixed with a solution of 2.7 g. of 2-dimethylamino-ethanol in 2 ml. of benzene. On rubbing, the salt crystallises. It is filtered off by suction, washed with 5 ml. of cold ether and dried. After recrystallisation from 30 ml. benzene and drying at room temperature in high vacuum, the 2-dimethylaminoethanol-salt of the 2-[p-(1-pyrryl)-phenyl]-butyric acid melts at 96–100°, after sintering at 91°.

EXAMPLE 10

6.0 g. of 2-[p-(1-pyrryl)-phenyl]-butyric acid are dissolved in 10 ml. of 2 N potassium hydroxide, the solution is filtered and concentrated under reduced pressure. The crystalline residue is recrystallised from dioxane-isopropanol (10:1). The potassium salt of 2-[p-(1-pyrryl)-phenyl]-butyric acid so obtained melts at 255°, decomposition from 230°.

What we claim is:

1. The process for the preparation of p-(1-pyrryl)-phenylalkanoic acid derivatives of the formula:

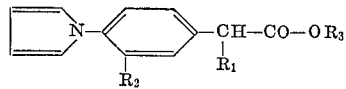

wherein $R_1$ is hydrogen, methyl or ethyl; $R_2$ is hydrogen or chloro; and $R_3$ is hydrogen, methyl or ethyl, which comprises (a) treating a p-nitrosophenylalkanoate of the formula

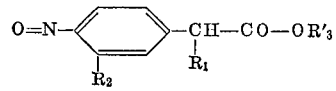

wherein $R'_3$ methyl or ethyl, with butadiene at a temperature of from 0° to 80° to yield a 3,6-dihydro-2H-1,2-oxazine derivative of the formula

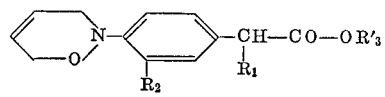

(b) subjecting said 3,6-dihydro-2H-1,2-oxazine derivative to dehydration through heating or acidic means so as to effect contraction of the 3,6-dihydro-2H-1,2-oxazine ring; and (c) subjecting the reaction product of the dehydration to either
  (i) esterification in the presence of the corresponding lower alkanol so as to yield a p-(1-pyrryl)phenylalkanoic acid derivative as defined wherein $R_3$ is methyl or ethyl or
  (ii) saponification in an alkaline medium so as to yield a p-(1-pyrryl)phenylalkanoic acid derivative as defined where $R_3$ is hydrogen.

2. The process according to claim 1 wherein the dehydration is effected by heating said 3,6-dihydro-2H-1,2-oxazine derivative with a lower alkanoic acid.

3. The process according to claim 1 wherein the dehydration is effected by heating said 3,6-dihydro-2H-1,2-oxazine derivative with a lower alkanoic acid and toluene, a xylol or chlorobenzene.

4. The process according to claim 1 wherein the dehydration is effected by subjecting said 3,6-dihydro-2H-1,2-oxazine derivative to a mixture of acetic acid and hydrogen bromide.

5. The process according to claim 1 wherein the dehydration is effected through distillation or sublimation of said 3,6-dihydro-2H-1,2-oxazine derivative at a temperature of from about 160° to about 240° and at a pressure of from about 0.001 torr to about 15 torr.

References Cited

UNITED STATES PATENTS 3,349,091  10/1967  Chinn  260—268

ALEX MAZEL, Primary Examiner

J. A. NARCAVAGE, Assistant Examiner

U.S. Cl. X.R.

260—244 R, 471 R